April 30, 1963
F. P. EVANS
3,087,469
FORCE AMPLIFICATION APPARATUS AND METHOD
Filed May 3, 1960
2 Sheets-Sheet 1
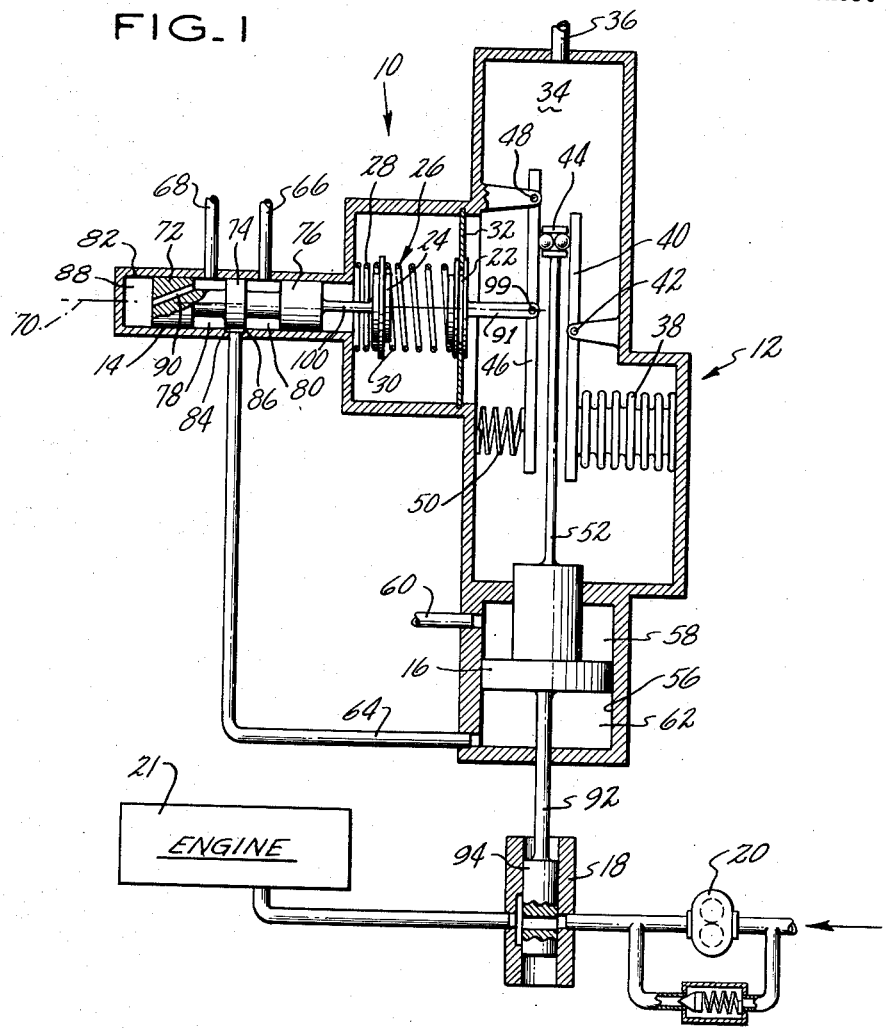
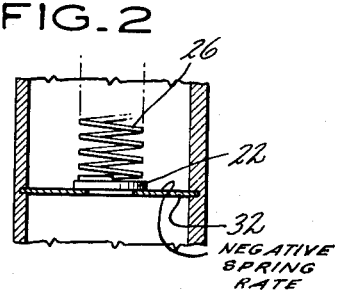
INVENTOR
FREDRICK P. EVANS
BY Vernon F. Hauschild
ATTORNEY April 30, 1963

F. P. EVANS 3,087,469

FORCE AMPLIFICATION APPARATUS AND METHOD

Filed May 3, 1960

INVENTOR
FREDRICK P. EVANS

BY *Vernon F. Hauschild*
ATTORNEY

United States Patent Office 3,087,469
Patented Apr. 30, 1963

3,087,469
FORCE AMPLIFICATION APPARATUS AND METHOD
Frederick P. Evans, West Hartford, Conn., assignor to United Aircraft Corporation, East Hartford, Conn., a corporation of Delaware
Filed May 3, 1960, Ser. No. 26,451
14 Claims. (Cl. 121—41)

This invention relates to force amplification apparatus.

It is an object of this invention to teach force amplification apparatus comprising the selective combining of springs and/or hydraulic loops having negative and positive rates or force gradients. As used herein, force gradient means the rate of a spring or the hydraulic force gradient of a hydraulic loop.

It is a further object of this invention to teach force amplification apparatus comprising input and output means in which said output means is positioned between two springs of positive rate located in series and in which said input means is positioned or supported by a spring of negative rate or between a spring of negative rate and the positive rate series springs, which negative rate spring is located in parallel with the positive rate springs.

It is a further object of this invention to teach force amplification apparatus which is capable of positioning an element which is susceptible to sticking such as a spool type pilot valve in response to a weak input signal and with means for imparting an amplified force to the spool valve should the sticking-prone element become jammed, which force would not be available without the force amplification arrangement.

It is a further object of this invention to substitute hydraulic loops having positive and negative hydraulic force gradients for the aforementioned springs.

Other objects and advantages will be apparent from the specification and claims, and from the accompanying drawings which illustrate an embodiment of the invention.

FIG. 1 is a schematic representation of my force amplification apparatus.

FIG. 2 is a partial showing of my FIG. 1 apparatus to illustrate input means support.

Figure 3:
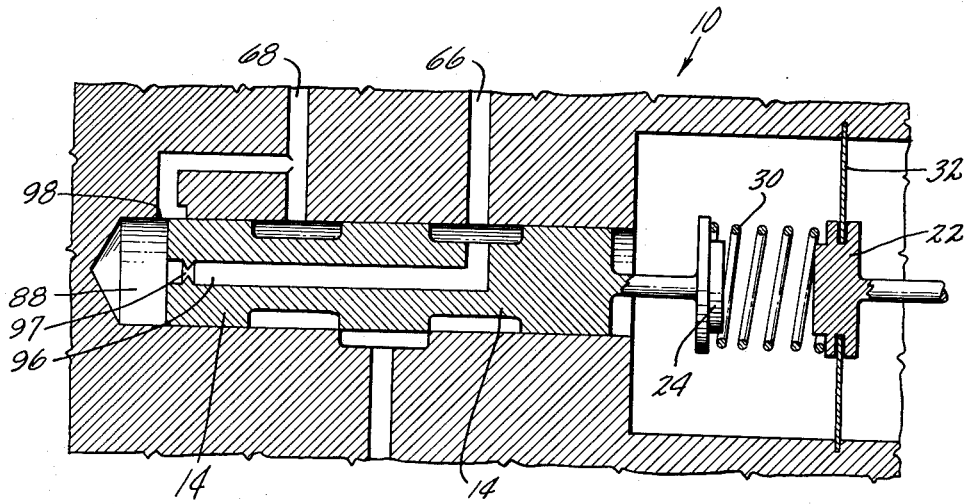
FIG. 3 is a partial showing of my FIG. 1 construction with a positive hydraulic force gradient substituted for the positive rate spring.

FIG. 1 depicts my force amplification apparatus 10 used in conjunction with servo system 12 to position pilot spool valve 14 and hence servo piston 16 to regulate the fuel flow through fuel control 18 to aircraft engine 21. Fuel from fuel pump 20 is directed through fuel control 18, which may be of the type taught in U.S. Patent No. 2,937,656 and which preferably contains overlapping window ports to regulate fuel flow to engine 21. Engine 21 may be of any conventional type but preferably of the type shown in U.S. Patents Nos. 2,426,-879, 2,711,631 and 2,747,367. While my force amplification apparatus is shown in this environment as a preferred embodiment, it will be evident to those skilled in the art that it is capable of use in any apparatus in which it is desired mechanically to amplify light or weak input signals. Further, while a spring suspended system will be described in detail, it will be shown hereinafter that hydraulic loops may be used with or instead of springs and a greater operating range will be attained thereby.

Figure 4:
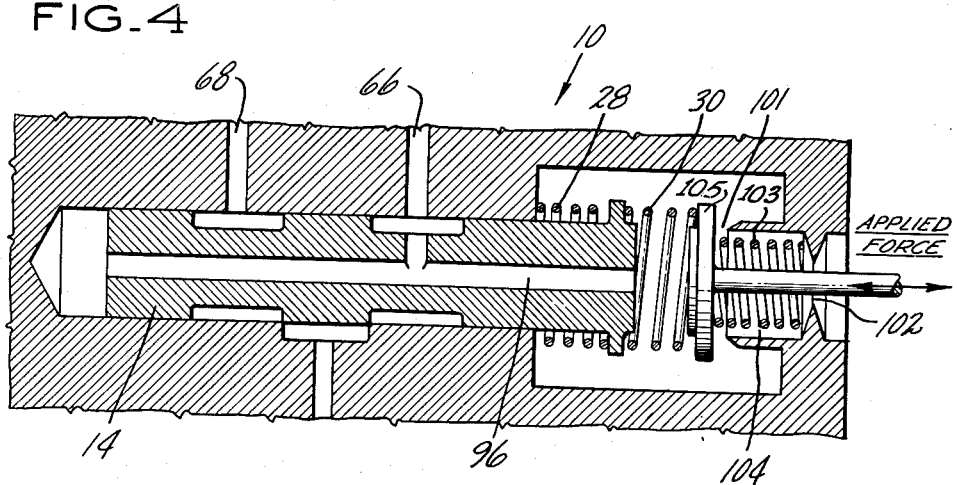
FIG. 4 is a partial showing of my FIG. 1 construction with a negative hydraulic force gradient substituted for the negative rate spring.

My force amplification apparatus 10 comprises input member 22 and output member 24. Output member 24 is supported by spring unit 26 which comprises springs 28 and 30 which are of positive spring rate and positioned or located in series with one another and on opposite sides of output means or member 24. Spring 28 extends from ground to output member 24 while spring 30 extends from output member 24 to input member 22. Input means 22 is located or positioned by spring 32 which is of negative spring rate, such as a Belleville washer between its end positions, with positive spring unit 26 bearing thereagainst as shown in FIG. 1 or may be positioned between negative spring 32 and spring unit 26, as best shown in FIG. 2 without result change. Spring 32 is preferably of the Belleville washer type and is retained in its negative rate, i.e. intermediate position during operation by spring unit 26. A Belleville washer has the characteristic that it is frusto-conical in shape when in its unloaded position, and it may be designed to have a negative spring rate such that when deflected toward a flat position it passes first through a maximum preload position to an intermediate or lesser preload position when at or near the flat position. Accordingly, it will be seen that the negative rate spring travels from a greater to a lesser preload condition as its deflection increases. As best shown in FIG. 1, when force amplification apparatus 10 is assembled, input means 22, output means 24, negative rate spring 32 and positive rate spring unit 26 are connected so that negative rate spring 32 is deflected in a rightward direction, preloading it past the maximum preload position to the aforementioned intermediate negative rate or lesser preload position and hence imparts and initial deflection or preload to positive spring rate unit 26. Accordingly decreased deflection, i.e. leftward movement, of negative rate spring 32 by the input (leftward) motion of input means 22 is accompanied by an increase in load exerted by negative rate spring 32 which will increase deflection of or load on the positive rate spring unit 26, thereby imparting amplified force to output member 24 as further described hereinafter. In so assembling apparatus 10, Belleville washer 32 and the positive rate spring unit 26 are positioned in their unloaded or free condition so that the convex surface of washer 32 is projected toward positive rate spring unit 26. Upon completion of the assembly, the Belleville washer is deflected rightward or preloaded toward or to its flat position, or may even be slightly convex in the opposite direction, so that the Belleville washer has passed through its maximum preload position to an intermediate preload position and will thereby apply a deflection or preload to springs 28 and 30 of positive rate spring unit 26. Leftward or input motion of input member 22 will decrease the deflection of Belleville washer 32 and such action will increase the deflection or loading of each positive rate spring 28 and 30 and also of positive rate spring unit 26. The above characteristics of a Belleville washer are more fully described and illustrated on pages 305 and 314 of volume 58, No. 4 of the May 1936 publication "Transactions of the American Society of Mechanical Engineers" and in the figure on page 177 of a book entitled Design of Machine Members by Alex. Vallance, published by Mc-Graw Hill, first edition, 1938. A hydraulic negative rate system as shown in FIG. 4 may be substituted for the mechanical negative rate of the Belleville washer 32.

Servo system 12 comprises chamber 34 which is subjected to compressor discharge pressure through aperture 36 and further includes evacuated bellows 38, positioned in chamber 34 so as to be responsive to atmospheric conditions. As evacuated bellows 38 expands and contracts in response to atmospheric variations, it causes lever 40 to pivot about pivot point 42 and to vary the position of roller unit 44 and hence the position of lever 46 which is pivotable about pivot point 48. Spring 50 biases lever 46 toward roller unit 44. Roller unit 44 is connected by rod 52 to servo piston 16, which is contained within servo cylinder 56. High pressure fluid enters chamber 58 of cylinder 56 through aperture 60 while servo or control fluid enters chamber 62 of cylinder 56 through line 64. Servo fluid is regulatably directed into line 64 from either line 66 or line 68, which are in communication with a high and low pressure source, respectively (not shown). The regulation of servo fluid into line 64 from lines 66 and 68 is accomplished by the position of pilot spool valve 14 which is in axial alignment along axis 70 with my force amplification device 10 and members 22, 24, 28, 30 and 32 thereof. Spool valve 14 comprises a plurality of axially spaced lands such as 72, 74 and 76 which are separated by axially aligned and spaced grooves 78 and 80 so that the position of pilot spool valve 14, which fits snugly into cylinder 82, regulates the areas of metering ports 84 and 86, defined between pilot spool valve 14 and cylinder 82 and further determines whether line 64 is to be in communication with line 66 or line 68. The spool valve 14 is biased toward input means 22 by a spring 28. It could be biased as shown in FIG. 3 by a hydraulic pressure admitted into chamber 88 through bleed line 96, the metering effect of opening 98 being such as to produce hydraulically the same effect as mechanical spring 28. Accordingly, it will be seen that the positioning of pilot spool valve 14 by my force amplification apparatus 10 in response to input signals received from servo mechanism 12, regulates the servo pressure in chamber 62 and hence the position of servo piston 16. Since servo piston 16 is connected through linkage 92 to the window port defining area concentric sleeves 94 of fuel control 18, it will be seen that the controlled position of servo piston 16 regulates the flow of fuel from fuel pump 20 through fuel control 18 into engine 21.

*Operation*

Compressor discharge pressure changes are reflected in the expansion or contraction of bellows 38 and feed signals proportional to atmospheric pressure through lever 40, roller unit 44 and lever 46 to input member 22 which is connected by rod 91, preferably pivotally at 99, to lever 46. This input signal to input member 22 from bellows 38 in the fashion just described causes the deflection of negative rate spring 32 and the consequential deflection of positive spring unit 26 to position output member 24 and hence pilot spool valve 14, which is connected to output member 24 in any fashion including pivotally and integrally by connecting rod 100. Force amplification will be imparted to pilot spool valve 14 by unit 10 when pilot spool valve 14 sticks. Sticking or high frictional resistance often results from the close clearance, such as .000060 inch, which exists between spool 14 and cylinder 82, in a fashion to be described hereinafter. The position of spool valve 14 regulates the flow of actuating fluid from either line 66 or 68 through ports 84 or 86, respectively, into servo line 64 and hence into servo chamber 62 to position servo piston 16 in opposition to the pressure which exists in chamber 58. The servo positioning of piston 16 in the fashion just described firstly positions fuel flow concentric sleeves 94 of fuel control 18 to regulate the flow of fuel from fuel pump 20 to engine 21 and, secondly, acts in a feedback fashion through roller unit 44 to reposition servo system 12.

*Force Amplification*

Let us consider that the spring rate of spring 32 ($K_1$) is 260.34 lbs./in., that the spring rate of spring 30 ($K_2$) is 270 lbs./in. and that the spring rate of spring 28 ($K_3$) is 9,910 lbs./in. The combined spring rates of springs 28 and 30

$$(K_{e3,2}) = \frac{K_3 K_2}{K_3+K_2} = \frac{9{,}910 \times 270}{9{,}910+270} = 262.84 \text{ lbs./in.}$$

For a free pilot valve 14: $K_{e1,2,3} = K_1 + K_{e3,2} = 2.5$ lbs./in., therefore, .01 lb. applied force from servo system 12 to input member 22 will deflect plate 22 a distance equal to $\Delta Z$ in accordance with the formula $$\Delta Z = \frac{\Delta f_s}{K_{e1,2,3}}$$

wherein $\Delta f_s$ = the force applied to input member 22. For the case where $\Delta f_s = .01$ lb., then $\Delta Z = .004$ inch.

When pilot or spool valve 14 exerts no load on output member 24, the output member 24 and hence the spool valve 14 will be moved a distance equal to $$\Delta X : \Delta X = \frac{K_2}{K_3 + K_2} \Delta Z$$

$$\Delta X = \frac{270}{10180} \times .004 = .0001061 \text{ in.}$$

This is a significant distance, because in high performance pilot or spool valves 14, wherein the clearance is equal to .000060 in., the metered pressure is changed about 100% of the pressure drop from supply to drain in .0002 in. of pilot valve travel.

When valve 14 is stuck due to cocking, particle wedging or the like, the following force is delivered by unit 10 to valve 14. Since the stuck condition of pilot valve 14 immobilizes spring 28, the combined rate of springs 28 and 30 is equal to that of $K_2$ only. So that for a stuck pilot valve 14, $K_{e1,2,3} = K_1 + K_{e2,3} = 260.34 + 270 = 9.66$ lbs./in. and, accordingly, the applied force $\Delta f_s$ of .01 to input member 22 will deflect plate 22 a distance $$\Delta Z' = \text{to } \frac{.01}{9.66} = .0010352 \text{ in.}$$

This motion to input member 22 will impart a force $\Delta f' = Z' \times K_2 = .0010352 \times 270 = .2795$ lb. It will therefore be seen that the ratio of the force applied to member 24 and hence pilot spool valve 14 to the force applied to member 22 during the valve stuck condition equals $$\frac{\Delta f'}{\Delta f_s} = \frac{.2795}{.01} = 27.95$$

and therefore 27.95 is the amplification factor.

FIG. 3, which is included to illustrate how a hydraulic loop may be substituted for a spring, shows a portion of my FIG. 1 embodiment with a positive hydraulic force gradient loop substituted for spring 28. In the positive loop, high pressure fluid $P_H$ from line 66 enters passage 96 and then passes thru fixed restriction 97, into chamber 88, then thru variable area orifice 98. Since orifice 98 is determined by the position of piston 14 within its cylinder, the hydraulic pressure in cavity 88 is proportional to the position of piston 14, and, since the hydraulic force of resistance to motion generated in cylinder 88 increases as the motion imparting force from unit 12 increases, chamber 88 is of positive hydraulic force gradient.

FIG. 4 shows a portion of my FIG. 1 embodiment with a negative hydraulic force gradient loop substituted for spring 32. The pressure generated in chamber 104 by passing high pressure fluid $P_H$ from line 66 thru line 96, variable area restriction 101, chamber 104 and fixed restriction 102 increases to augment motion to piston 14 as the motion imparting force from unit 12 increases, hence, chamber 104 is of negative hydraulic force gradient. Positive rate spring 103 is added in chamber 104 to substantially balance the force created on the left side of the applied force piston 105 by the fluid pressure from passage 96.

The FIGS. 3 and 4 configurations may have range of operation advantages over the pure spring configuration.

It is to be understood that the invention is not limited to the specific embodiment herein illustrated and described but may be used in other ways without departure from its spirit as defined by the following claims.

I claim:
1. Force amplification apparatus comprising first means having a negative force gradient, second means having a positive force gradient, means connecting said first and second means in parallel so that said first means is moved in a first direction from a greater preload position to an intermediate preload position and connected to said second means so that said first means when so preloaded preloads said second means and further so that motion in a second direction opposite to said first direction of said first means when so preloaded will increase the loading of said second means.

2. Apparatus according to claim 1 wherein said second means includes a positive hydraulic force gradient loop.

3. Apparatus according to claim 1 wherein said first means includes a negative hydraulic force gridient loop.

4. Force amplification apparatus comprising first means supported by a spring having a negative rate, second means supported between springs having positive rates and which are in parallel with said negative rate spring, means connecting said first and second means so that said negative spring is deflected and thereby deflects said positive springs and further so that decreased deflection of said negative rate spring will increase deflection of said positive rate springs, input means imparting a load to said first means tending to decrease deflection of said negative rate spring and hence increased deflection of said positive rate springs to move said second means which acts as output means with force amplification over said input means.

5. Force amplification apparatus comprising first means supported by a spring having a negative rate, second means supported between springs having positive rates and which are in series with each other and in parallel with said negative rate spring, means connecting said first and second means so that said negative spring is deflected and thereby deflects said positive springs and further so that decreased deflection of said negative rate spring will increase deflection of said positive rate springs, input means imparting a load to said first means tending to decrease deflection of said negative rate spring and hence increase deflection of said positive rate springs to move said second means, and output means actuated by said second means with force amplification over said input means.

6. Force amplification apparatus comprising input means, a negative rate spring supporting said input means, output means, a first positive rate spring joining said input means to said output means, a second positive rate spring extending from said output means to ground so that said positive rate springs are in series with one another and so that said positive rate springs are in parallel with said negative rate spring, and means connecting said springs and said input and output means so that said negative spring is deflected and thereby deflects said positive springs and further so that decreased deflection of said negative rate spring will increase deflection of said positive rate springs and further so that input motion of said input means tends to decrease deflection of said negative rate spring and hence increase deflection of said positive rate springs thereby moving said output means with force amplification over said input means.

7. Force amplification apparatus comprising two positive rate springs positioned in series, a negative rate spring positioned in parallel with said positive rate springs, input means positioned between said negative rate spring and said positive rate springs, output means positioned between said positive rate springs, and means connecting said springs and said input and output means so that said negative spring is deflected and thereby deflects said positive springs and further so that decreased deflection of said negative rate spring will increase deflection of said positive rate springs and further so that input motion of said input means tends to decrease deflection of said negative rate spring and hence increase deflection of said positive rate springs thereby moving said output means with force amplification over said input means.

8. Force amplification apparatus having an axis and comprising two juxtapositioned positive rate springs and a negative rate spring in axial alignment so that said positive rate springs are in series with each other and in parallel with said negative rate spring, input means supported between said negative rate spring and said positive rate springs, output means supported between said positive rate springs, and means connecting said springs and said input and output means so that said negative spring is deflected and thereby deflects said positive springs and further so that decreased deflection of said negative rate spring will increase deflection of said positive rate springs and further so that input motion of said input means tends to decrease deflection of said negative rate spring and hence increase deflection of said positive rate springs thereby moving said output means with force amplification over said input means.

9. Force amplification apparatus having an axis and comprising two juxtapositioned positive rate springs and a negative rate spring in axial alignment so that said positive rate springs are in series with each other and in parallel with said negative rate spring, input means supported between said negative rate spring and said positive rate springs, output means supported between said positive rate springs, means connecting said springs and said input and output means so that said negative spring is deflected and thereby deflects said positive springs and further so that decreased deflection of said negative rate spring will increase deflection of said positive rate springs and further so that input motion of said input means tends to decrease deflection of said negative rate spring and hence increase deflection of said positive rate springs thereby moving said output means with force amplification over said input means, and feedback means joining said output and input means.

10. Force amplification apparatus comprising a spring unit including two axially aligned, juxtapositioned positive rate springs in series, a negative rate spring axially aligned with, juxtapositioned to and in parallel with said spring unit, input means supported between said spring unit and said negative rate spring, output means supported between said positive rate springs, and means connecting said springs and said input and output means so that said negative spring is deflected and thereby deflects said positive springs and further so that decreased deflection of said negative rate spring will increase deflection of said positive rate springs and further so that input motion of said input means decreases deflection of said negative rate spring and hence increases deflection of said positive rate springs thereby moving said output means with force amplification over said input means.

11. The method of providing force amplification comprising establishing a positive force gradient and a negative force gradient between input and output means and connecting the force gradients so that both are preloaded so that increased input motion of the input means will tend to increase the load supplied by the negative force gradient and thereby further load the positive force gradient to provide force amplification to the output means.

12. Force amplification apparatus comprising first means having a negative force gradient, second means having a positive force gradient, means connecting said first and second means in parallel so that said first means is moved in a first direction from a greater preload position to an intermediate preload position and connected to said second means so that said first means when so preloaded preloads said second means and further so that any movement of said first means in a second direction opposite to said first direction will increase the loading of said second means, input means imparting a force tending to move said first means in said second direction and thereby increase the load on said second means which acts as output means with force amplification.

13. Force amplification apparatus comprising first means having a negative force gradient, second means having a positive force gradient, means connecting said first and second means in parallel so that said first means is deflected and preloaded so that it attempts to decrease deflection toward said second means to deflect said second means and further so that any decrease in deflection in said first means will increase deflection of said second means, input means imparting a second load to decrease deflection of said first means and thereby increase deflection of said second means which acts as output means with force amplification.

14. The method of providing force amplification comprising placing a positive rate spring and a negative rate spring in parallel between input and output means and connecting the springs so that both are deflected so that the input means will tend to decrease deflection of the negative rate spring and thereby increase deflection of the positive rate spring to provide force amplification to the output means.

References Cited in the file of this patent
UNITED STATES PATENTS

| | | |
|---|---|---|
| 2,308,475 | Fawkes | Jan. 12, 1943 |
| 2,824,919 | Davis | Feb. 25, 1958 |
| 2,872,943 | Easter | Feb. 10, 1959 |